(12) United States Patent
Chass

(10) Patent No.: US 6,628,017 B1
(45) Date of Patent: Sep. 30, 2003

(54) FERROFLUIDIC, ELECTROMAGNETIC POWER SUPPLY

(76) Inventor: Jacob Chass, 70-25 Yellowstone Blvd. Apt. 24D, Forest Hills, NY (US) 11375

( * ) Notice: Subject to any disclaimer, the term of this patent is extended or adjusted under 35 U.S.C. 154(b) by 0 days.

(21) Appl. No.: 10/213,008

(22) Filed: Aug. 6, 2002

(51) Int. Cl.$^7$ ................................................ G01P 15/11
(52) U.S. Cl. ...................................... 310/11; 73/514.08
(58) Field of Search .............................. 310/11; 33/377; 73/514.08

(56) References Cited

U.S. PATENT DOCUMENTS

| | | | | |
|---|---|---|---|---|
| 2,427,866 A | * | 9/1947 | Macgeorge | 336/136 |
| 3,184,861 A | * | 5/1965 | Conrad | 33/366.18 |
| 3,464,276 A | * | 9/1969 | Leibert | 73/514.09 |
| 3,516,294 A | * | 6/1970 | Schmieder | 73/514.08 |
| 3,839,904 A | * | 10/1974 | Stripling et al. | 73/654 |
| 4,023,278 A | * | 5/1977 | Hoyt | 33/377 |
| 4,064,409 A | * | 12/1977 | Redman | 310/306 |
| 4,220,907 A | * | 9/1980 | Pappas et al. | 322/3 |
| 4,676,103 A | * | 6/1987 | Nakajima | 73/514.09 |
| 4,706,498 A | * | 11/1987 | Nemnich et al. | 73/514.08 |
| 4,790,076 A | * | 12/1988 | Adams | 33/365 |
| 4,808,079 A | * | 2/1989 | Crowley et al. | 417/50 |
| 4,991,301 A | * | 2/1991 | Hore | 33/366.2 |
| 4,991,438 A | * | 2/1991 | Evans | 73/514.08 |
| 5,317,299 A | * | 5/1994 | Dhyanchand et al. | 336/5 |
| 5,450,853 A | * | 9/1995 | Hastings et al. | 600/488 |
| 5,456,013 A | * | 10/1995 | Elias | 33/366.18 |
| 5,490,425 A | * | 2/1996 | Raj et al. | 73/745 |
| 5,587,698 A | * | 12/1996 | Genna | 340/442 |
| 5,632,093 A | * | 5/1997 | Elias | 33/366.25 |
| 5,780,741 A | * | 7/1998 | Raj | 73/514.08 |
| 5,908,987 A | * | 6/1999 | Raj | 73/514.09 |
| 6,106,236 A | * | 8/2000 | Henoch et al. | 417/50 |
| 6,489,694 B1 | * | 12/2002 | Chass | 310/11 |
| 6,504,271 B2 | * | 1/2003 | Chass | 310/11 |
| 2002/0153781 A1 | * | 10/2002 | Chass | 310/11 |

* cited by examiner

Primary Examiner—Nestor Ramirez
Assistant Examiner—Heba Y. M. Elkassabgi

(57) ABSTRACT

A ferrofluidic electromagnetic power supply firmly attached to an agitating object, such as the interior of a vehicular tire generates electric current in an electrical coil deposited between and firmly attached to an hermetically sealed housing made of non-magnetic material partially filled with ferrofluid and a permanent magnet axially polarized. The ferrofluid and the permanent magnet form a magnetic circuit extending from the ferrofluid through the coil to the permanent magnet and back to the ferrofluid. Agitation of the power supply will cause dislocation of the magnetized ferrofluid within the sealed housing causing induction in the electrical coil.

16 Claims, 4 Drawing Sheets

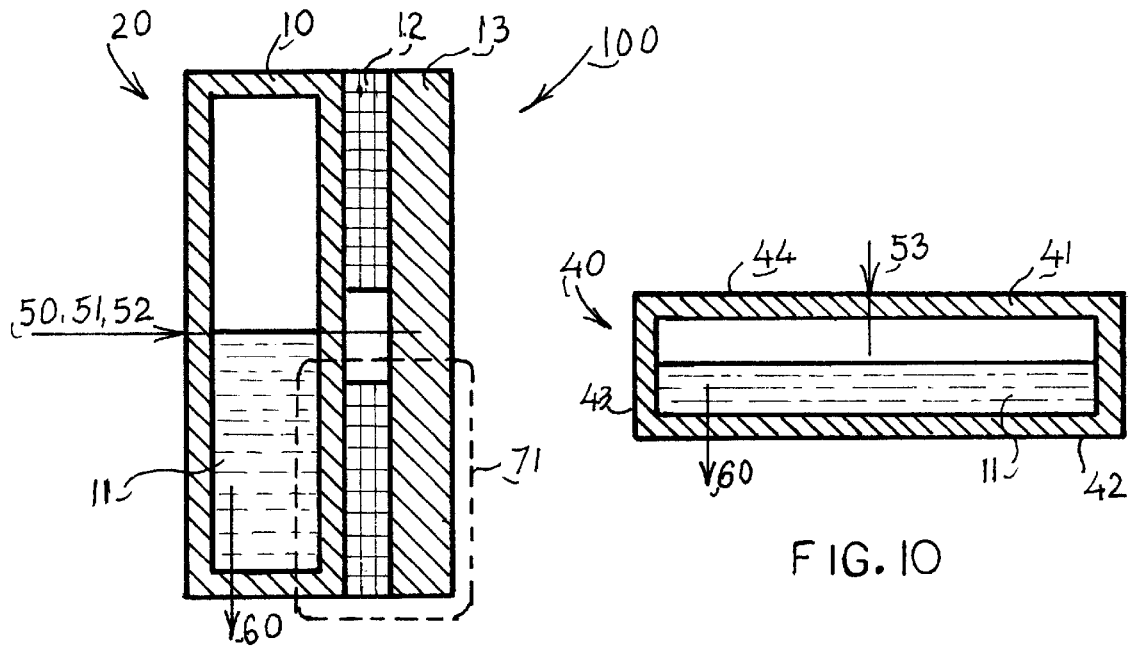
FIG. 8
FIG. 10
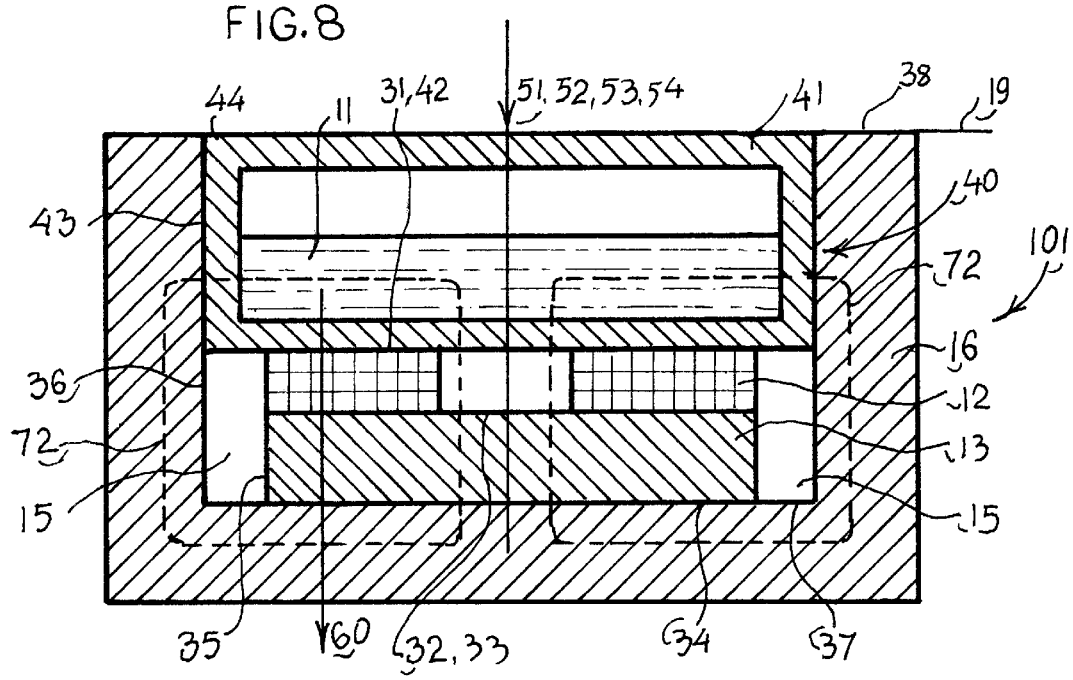
FIG. 9

FERROFLUIDIC, ELECTROMAGNETIC POWER SUPPLY

CROSS REFERENCES

| U.S. patents | | |
|---|---|---|
| 3,839,904 | October 1974 | Stripling et al. |
| 4,064,409 | December 1977 | Redman |
| 5,632,093 | May 1997 | Elias |
| 5,908,987 | June 1999 | Raj ; Kuldip |

BACKGROUND OF THE INVENTION

The present invention relates to an electromagnetic power supply and in particular to an electrical power generator intended for installation within a vehicular tire. Such electrical power generator can supply electrical power to energize a pressure sensor and a high frequency radio transmitter for monitoring tire air-pressure while traveling. Incorrect low tire pressure may cause, while traveling, tire rupture and an accident.

A system for generating electrical power utilizing ferrofluid is described in U.S. Pat. No. 4,064,409, by Charles M. Redman. Thermal energy is converted into electrical power using flow of magnetized ferrofluid through a coil. An additional system utilizing ferrofluid and a permanent magnet is described in U.S. Pat. No. 5,632,093 by Sharon A. Elias, where mechanical vibrations are converted into an electrical voltage.

SUMMARY OF THE INVENTION

The ferrofluidic, electromagnetic power supply constructed in accordance with the principles of the present invention consists of: a sealed housing made of non-magnetic material partially filled with ferrofluid ; a flat electrical coil wound of insulated, electrically conductive wire firmly attached to a flat part of said housing; a cylindrical -section permanent magnet axially polarized firmly attached to the other flat side of said coil. A magnetic circuit is formed extending from said ferrofluid through said coil to said permanent magnet and back to said ferrofluid. Agitation of the power supply will cause dislocation of said ferrofluid, and therefore, induction in the electrical coil.

In view of the above it is the principal object of the present invention to provide an electromagnetic power supply to power a pressure sensor and radio transmitter for the purpose of monitoring air pressure within the tire while the vehicle is in motion.

A still further object of the present invention is to provide such a device that has the capability to generate electrical power when firmly attached to an agitating object.

A further object is to provide such a device which may be small in size reliable, with no movable solid mechanical components.

A still further object is to provide such a device, which is simple in design and easy to manufacture. The above objects and advantages are attained with the present invention by providing two embodiments of a ferrofluidic, electromagnetic power supply.

BRIEF DESCRIPTION OF THE DRAWINGS

FIG. 8 is a schematic diagram, side view section, of the first embodiment of FIG. 1, shown in a vertical position.

FIG. 9 is a schematic diagram, side view section of the second embodiment of the invention, shown in horizontal position, illustrating direction of force of gravity and magnetic circuit.

FIG. 10 is a schematic diagram, side view section of the hermetically sealed housing assembly utilized in the second embodiment of the invention.

DETAILED DESCRIPTION OF THE DRAWINGS

Figure 1:
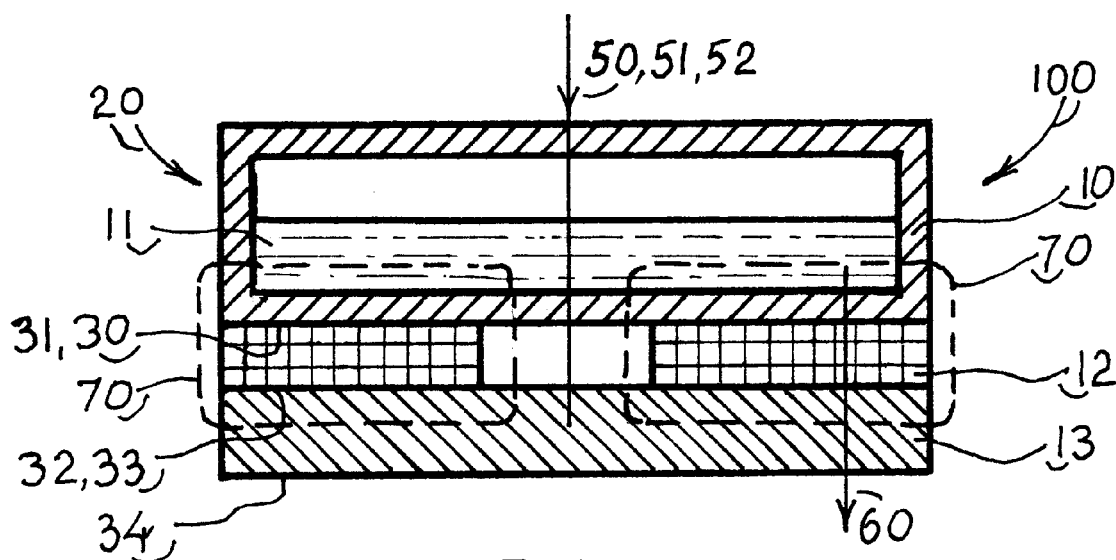
FIG. 1 is a schematic diagram, side view section of the first embodiment of the invention, shown in horizontal position illustrating direction of force of gravity and magnetic circuit.
Figure 2:
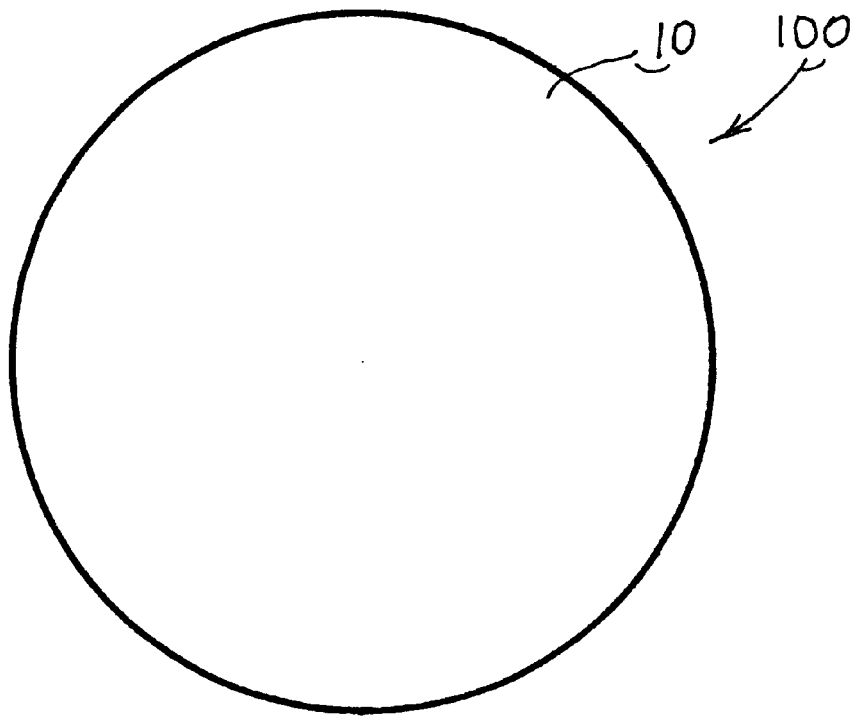
FIG. 2 is top and bottom view of the first embodiment shown in FIG. 1.
Figure 3:
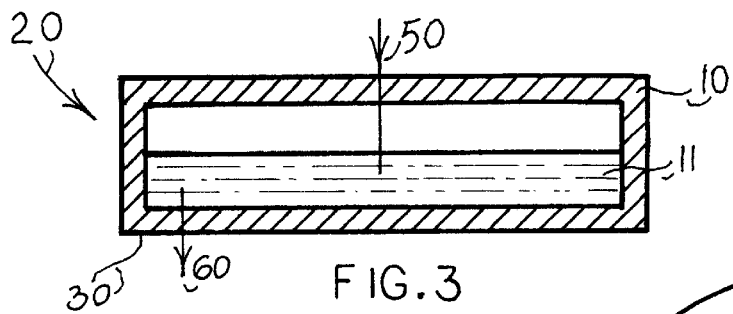
FIG. 3 is a schematic diagram, side view section of the hermetically sealed housing assembly utilized in the first embodiment of the invention.
Figure 6:
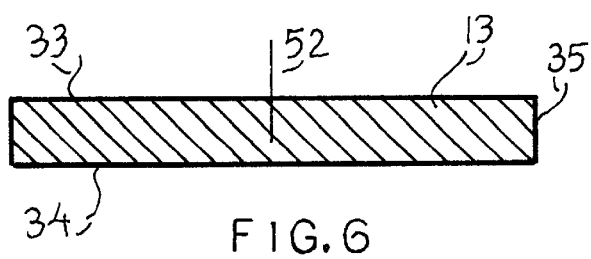
FIG. 6 illustrates side view section of the permanent magnet and its axis; it is axially polarized and is utilized in the first and second embodiment of the invention.
Figure 7:
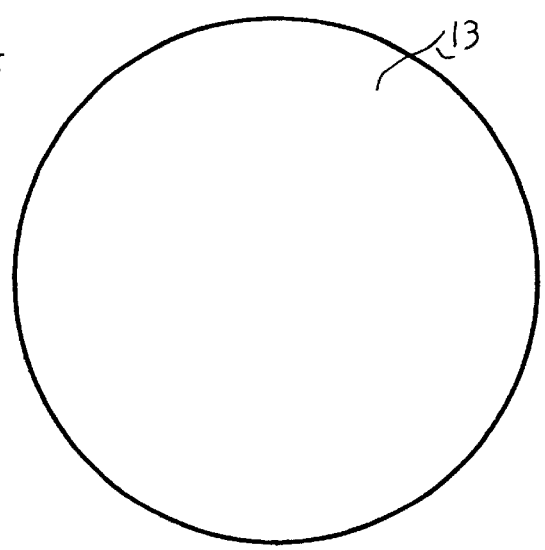
FIG. 7 is top and bottom view of the permanent magnet shown in FIG. 6.

Reference is now made to the drawings and to FIG. 1 in particular, wherein a first embodiment of the ferrofluidic, electromagnetic power supply is depicted. Power supply 100 comprises: housing assembly 20 (FIG. 3), electrical coil 12 (FIG. 4) and a permanent magnet axially polarized 13 (FIG. 6). Housing assembly 20 comprises a closed housing 10, made of non-magnetic material said housing having a flat surface 30. The housing, in general, is a shallow cylinder closed at both ends and generally, hermetically sealed and it is partially filled with ferrofluid 11. Also shown, the direction of force of gravity 60, axis and axial direction 50. Axial direction 50 and direction of force of gravity 60 substantially coincide. Coil 12 (FIG. 4) is wound of insulated, electrically conductive wire and is generally flat and shallow. Said coil may be wound in self-supporting form (no need for a bobbin) or may be produced as a bobbin-winding assembly. Shown are (FIG. 4) first surface 31, second surface 32 and axis 51 of coil 12. External periphery of housing 10 (FIG. 3) and external periphery of coil 12 (FIG. 4) are generally equal to each other. Permanent magnet 13 (FIG. 6) is, in general, a shallow section of a solid cylinder having a first face 33, second face 34 and periphery 35, said faces are flat and parallel to each other. Also shown axis 52 of said permanent magnet (FIG. 6). Said permanent magnet is axially polarized.

Assembly procedure of ferrofluidic electromagnetic power generator 100.

First surface 31 of coil 12 is firmly attached to flat surface 30 of housing 10, axis 50 and axis 51 substantially coincide. First face 33 of permanent magnet 13 (FIG. 6) is firmly attached to second surface 32 of coil 12 (FIG. 4), axis 51 and axis 52 substantially coincide, forming a ferrofluidic, electromagnetic power supply.

External periphery 35 of polarized permanent magnet 13 (FIG. 6) and external diameter of coil 12 (FIG. 4) are generally equal to each other. Axis 50 of housing assembly 20, axis 51 of coil 12 and axis 52 of permanent magnet 13 substantially coincide. Also shown in FIG. 1 is magnetic circuit 70, extending from magnetized ferrofluid 11 through flat surface 30 of housing 10 through coil 12 to first face 33 of permanent magnet 13 to second face 34 of permanent magnet 13 to housing 10 and back to magnetized ferrofluid 11.

In operation, agitating power supply 100 will cause dislocations in magnetized ferrofluid 11 within housing assembly 20, inducing variations in said magnetic circuit, causing induction in coil 12, producing electrical power.

Referring to FIG. 8, showing assembly 100, FIG. 1 in a vertical position, axial direction 50 is perpendicular to gravity direction 60. Said magnetic circuit 70 of FIG. 1 changed to magnetic circuit 71 of FIG. 8, dislocating magnetized ferrofluid 11, causing induction in coil 12 and producing electrical power.

Figure 11:
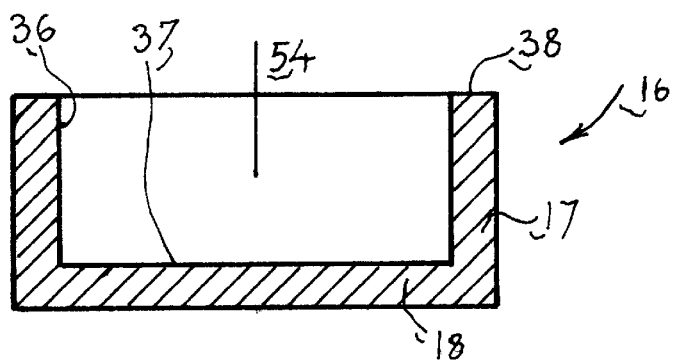
FIG. 11 is a schematic diagram, side view section of the magnetic frame shown in FIG. 9.
Figure 12:
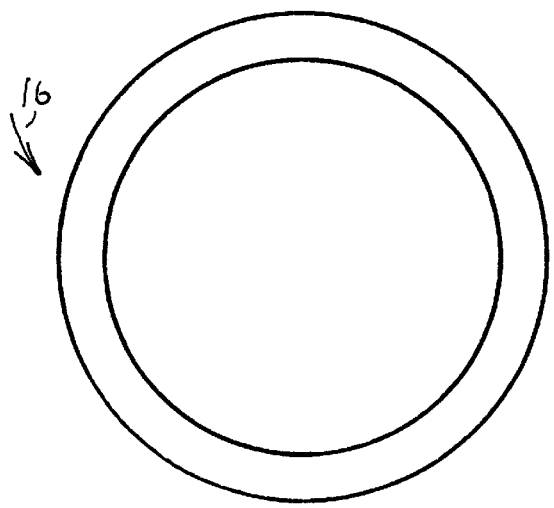
FIG. 12 is a top view of the magnetic frame shown in FIG. 11.

Reference is now made to FIG. 9 wherein a second embodiment of the ferrofluidic, electromagnetic power supply 101 is depicted. Power supply 101 comprises housing assembly 40 (FIG. 10), electrical coil 12 (FIG. 4), axially polarized permanent magnet 13 (FIG. 6) and magnetic frame 16 (FIG. 11, FIG. 12).

Housing assembly 40 (FIG. 10) comprises a closed housing 41 made of non-magnetic material and is partially filled with ferrofluid 11. Shown are axis and axial direction 53, direction of force of gravity 60, circular periphery 43, first flat plane 42 and second flat plane 44. Axial direction 53 and direction of force of gravity 60 substantially coincide. The housing, in general, is a shallow cylinder closed at both ends, made of non-magnetic material and generally, hermetically sealed. Coil 12 and axially polarized permanent magnet 13 are common to power supply 100 and power supply 101. Magnetic frame 16 is made of a magnetic cylindrical section 17, closed at one end by magnetic plate 18 (FIG. 11), shown are axis 54, inner flat surface 37 inner circular surface 36 and upper flat plain 38. The addition of magnetic frame that transforms power supply 100 into power supply 101 will decrease the magnitude of the magnetic reluctance of magnetic circuit 72 (FIG. 9). The gap between circular periphery 43 of housing 41 (FIG. 10) and inner circular surface 36 of magnetic frame 16 (FIG. 11) is made very small (FIG. 9).

Figure 4:
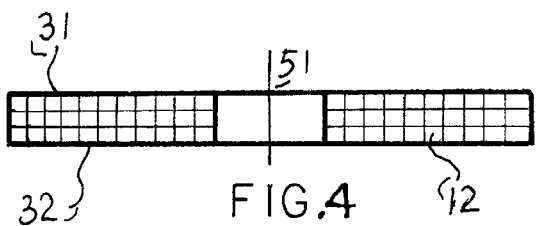
FIG. 4 illustrates side view section of the coil utilized in the first and second embodiment of the invention.
Figure 5:
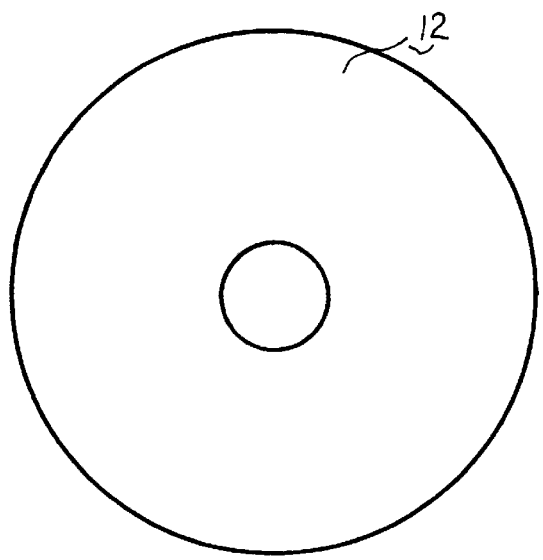
FIG. 5 is top and bottom view of the coil show in FIG. 4.

Assembly procedure of ferrofluidic, electromagnetic power supply 101. First surface 31 of coil 12 is firmly attached to first flat plane 42 of housing 40, axis 51 and axis 53 coincide. First face 33 of permanent magnet 13 (FIG. 6) is firmly attached to second surface 32 of coil 12 (FIG. 4). Flat inner surface 37 of magnetic frame (FIG. 11) is firmly attached to second face 34 of permanent magnet 13 (FIG. 6) forming the ferrofluidic, electromagnetic power supply.

The gap between periphery 35 of permanent magnet 13 (FIG. 6) and inner circular surface 36 of magnetic frame 16(FIG. 11) is made large, forming a non-magnetic gap 15. Referring to FIG. 9, upper flat plain 38 of magnetic frame 16 and second flat plain 44 of housing 41 generally coincide on common plain 19. Axes 51, 52, 53 and 54 substantially coincide. Also shown magnetic circuit 72 extending from ferrofluid 11 through first plain 42 through coil 12 to first face 33 of permanent magnet 13 to second face 34 of permanent magnet 13 to flat inner surface 37 and cylinder 17 of magnetic frame 16 to inner surface 36 of cylinder 17 through circular periphery 43 of housing 41 and back to magnetized ferrofluid 11.

In operation, agitating power supply 101 will cause dislocations in magnetized ferrofluid 11 within housing assembly 40, inducing variations in said magnetic circuit 72 causing induction in coil 12, and producing electrical power.

Figure 13:
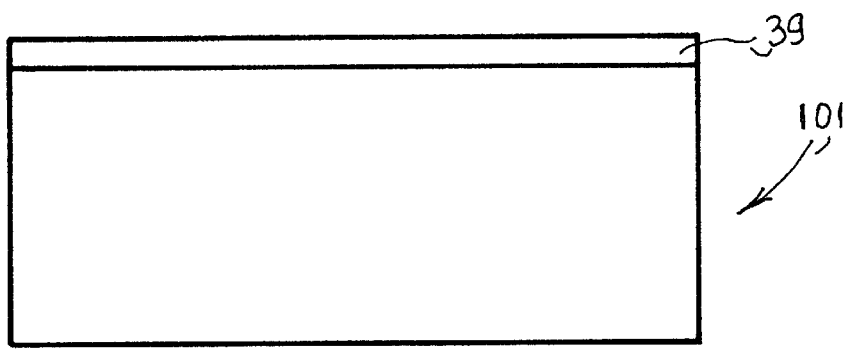
FIG. 13 is a schematic diagram, side view of the second embodiment or the invention, modified to include a cover, made of magnetic material.

Reference is now made to FIG. 13 showing modification of the second embodiment of the invention. Cover 39, made of magnetic material is firmly attached, at common plane 19, to power supply 101. Cover 39 provides mechanical and electromagnetic shield to power supply 101.

Although the inventions have been described with specific reference to two embodiments, it will be apparent to a knowledgeable person, upon reading this patents, that numerous modifications and alternative materials and arrangements may be devised by those skilled in the art without departing from the spirit and the scope of the inventions as defined by the appended claims.

What is claimed is:

1. A ferrofluidic, electromagnetic power supply for inducing electromotive force in an electrical coil comprising:

a closed housing made of non-magnetic material, said housing partially filled with ferrofluid;

at least one coil wound of insulated, electrically conductive wire; said coil has the ability to produce electrical power upon encircling a variable magnetic flux;

at least one permanent magnet axially polarized;

first surface of said coil is firmly attached to flat surface of said housing assembly; second surface of said coil is firmly attached to first face of said permanent magnet forming a magnetic circuit extending from magnetized ferrofluid through flat surface of said housing through said coil to first face of said polarized permanent magnet to second face of said permanent magnet and back to magnetized ferrofluid forming a ferrofluidic, electromagnetic power supply; variation in the distribution of said ferrofluid within said housing due mechanical dislocations of said housing will cause variations in said magnetic circuit causing induction in said coil producing electrical power.

2. The ferrofluidic, electromagnetic power supply of claim 1 wherein axis of said housing assembly, axis of said coil and axis of said permanent magnet substantially coincide.

3. The ferrofluidic, electromagnetic power supply of claim 1 wherein surfaces of said housing said coil and said permanent magnet, parallel to said axes, are circular substantially of the same diameter.

4. The ferrofluidic, electromagnetic power supply of claim 3 wherein axis of said housing axis of said coil and axis of said permanent magnet, substantially coincide.

5. The ferrofluidic, electromagnetic power supply of claim I wherein said housing is hermetically sealed.

6. The ferrofluidic, electromagnetic power supply of claim 3 wherein said housing is hermetically sealed.

7. A ferrofluidic, electromagnetic power supply for inducing electromotive force in an electrical coil comprising a closed housing made of non-magnetic material, said housing is partially filled with ferrofluid;

at least one coil wound of insulated, electrically conductive wire; said coil has the ability to produce electrical power upon enclosing a variable magnetic flux flow;

at least one permanent magnet axially polarized;

at least one frame; said frame is made of magnetic material; said magnetic frame consists of a hollow cylinder closed at one end by a circular plate; said magnetic frame having an inner flat surface, an inner circular surface and an upper flat plain; first surface of said coil is firmly attached to first flat plane of said housing assembly; second surface of said coil is firmly attached to first face of said polarized permanent magnet; second face of said polarized permanent magnet is firmly attached to inner flat surface of said magnetic frame; said second flat plain of said housing and upper flat plain of said magnetic frame generally coincide on said common plain, forming a magnetic circuit extending from the magnetized ferrofluid through first flat plain of said housing, through said coil to first face of said polarized permanent magnet, to second face of said polarized permanent magnet to inner flat surface of said magnetic frame and through inner circular surface of said magnetic frame through said housing to magnetized ferrofluid, forming a ferrofluidic, electromagnetic power supply; periphery of said axially polarized permanent magnet is smaller than the inner circular surface of said magnetic frame, forming a non-magnetic gap between said periphery of said axially polarized permanent magnet, and inner circular surface of said magnetic frame; variation in the distribution of said magnetized ferrofluid due to mechanical dislocations of said housing assembly will cause variations in said magnetic circuit, causing induction in said coil and producing electrical power.

8. The ferrofluidic, electromagnetic power supply of claim 7 wherein axis of said housing assembly, axis of said coil, axis of said polarized permanent magnet and axis of said magnetic frame substantially coincide.

9. The ferrofluidic, electromagnetic power supply of claim 7 wherein surfaces of said housing said coil said polarized permanent magnet and said magnetic frame, parallel to said axes, are circular.

10. The ferrofluidic, electromagnetic power supply of claim 9 wherein axis of said housing assembly, axis of said coil, axis of said polarized permanent magnet and axis of said magnetic frame substantially coincide.

11. The ferrofluidic, electromagnetic power supply of claim 7 wherein said housing is hermetically sealed.

12. The ferrofluidic, electromagnetic power supply of claim 9 wherein said housing is hermetically sealed.

13. The ferrofluidic, electromagnetic power supply of claim 7 wherein said magnetic cover is firmly attached to said upper flat plain of said magnetic frame, providing said common plain.

14. The ferrofluidic, electromagnetic power supply of claim 13 wherein axis of said housing assembly, axis of said coil, axis of said polarized permanent magnet and axis of said magnetic frame substantially coincide.

15. The ferrofluidic, electromagnetic power supply of claim 13 wherein surfaces of said housing said polarized permanent magnet and said magnetic frame, parallel to said axes, are circular.

16. The ferrofluidic, electromagnetic power supply of claim 13 wherein said housing is hermetically sealed.

* * * * *